Dec. 1, 1925.
E. V. MYERS
GAS ENGINE
Original Filed Aug. 14, 1911   3 Sheets-Sheet 1
1,564,009
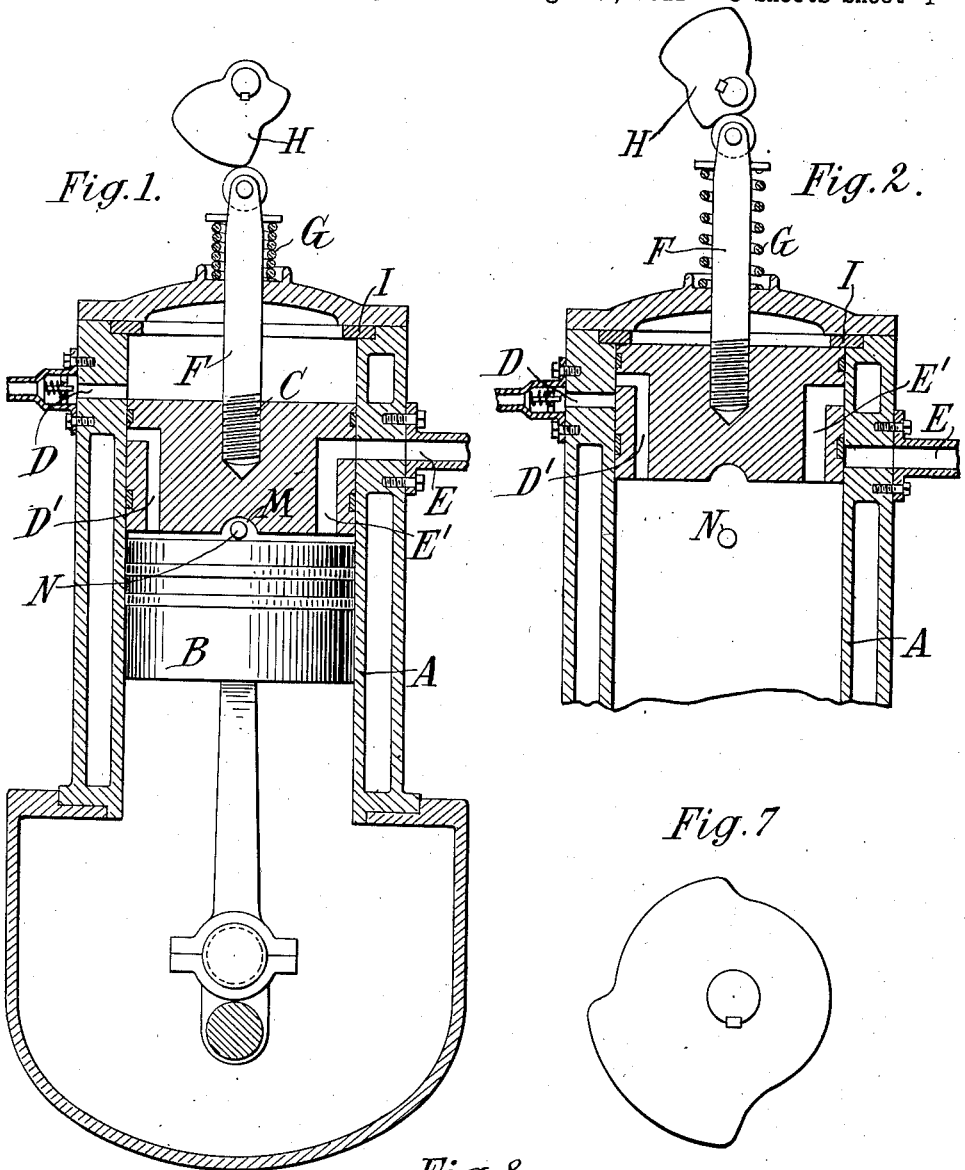

Dec. 1, 1925.

E. V. MYERS

GAS ENGINE

Original Filed Aug. 14, 1911    3 Sheets-Sheet 2

1,564,009

WITNESSES:

INVENTOR

Dec. 1, 1925.

E. V. MYERS

GAS ENGINE

Original Filed Aug. 14, 1911   3 Sheets-Sheet 3

1,564,009

Patented Dec. 1, 1925.

1,564,009

UNITED STATES PATENT OFFICE.

EUGENE V. MYERS, OF EAST ORANGE, NEW JERSEY.

GAS ENGINE.

Application filed August 14, 1911, Serial No. 643,820. Renewed May 6, 1922. Serial No. 559,058.

*To all whom it may concern:*

Be it known that I, EUGENE V. MYERS, a citizen of the United States, residing in East Orange, in the county of Essex and State of New Jersey, have invented certain new and useful Improvements in Gas Engines, of which the following is a specification.

This invention relates to gas engines, particularly of the four-cycle type.

Among the objects of the invention are (1) the provision of a single valve governing the intake and exhaust, such valve being preferably of the piston type; (2) the provision of a gas engine wherein there is an absolute scavenging; that is to say, that all the spent gases are expelled from the engine cylinder; (3) the provision of a gas engine in which at each intake stroke there is an increased body mixture taken into the cylinder, preferably equalling or nearly equalling the cylinder capacity plus the compression space; (4) the provision of a gas engine in which the capacity of the compression space may be altered to correspond with a given intake mixture.

Preferably all the features are embodied in a single construction, although it will be understood that each may be separately availed of, without departing from the invention.

In the drawings I have shown several forms of gas engine embodying the invention.

Fig. 1 is a central vertical section of one form of the invention, the parts being shown in one position;

Fig. 2 is a similar section of the same form, the parts being shown in another position;

Fig. 7 is one form of a cam used with Figs. 1 and 2;

Fig. 8 is a form of cam used with Figs. 3 and 4.

Figure 5:
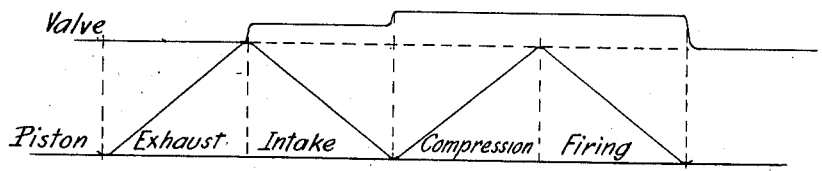
Fig. 5 is a diagram of the movements of the valve and piston of Figs. 1 and 2.

Referring to Fig. 1, A is an engine cylinder, B the ordinary piston, and C a valve. The valve C preferably operates in the engine cylinder, and the cylinder preferably has an intake port D and an exhaust port E. The valve C is provided with a number of piston rings as shown and inlet and outlet ports D' E'. The piston valve C is also provided with an operating rod F which is moved upwardly by a spring G and downwardly by a cam H. The cam H may be adapted to produce both movements if desired. Referring to Fig. 1, it will be seen that the piston valve is in position where the outlet port E' is in communication with the outlet port E. In this position the piston valve is near the end of its downward stroke, and its lower face may substantially meet the upper face of the piston B, which at this time is near the end of its exhaust stroke. Only sufficient clearance to avoid contact need be permitted. Hence the exhaust gases are substantially entirely expelled from the cylinder. As soon as the exhaust stroke is completed and the piston starts down on its intake stroke, the piston valve moves to a position in which the port D' alines with the port D. The mixture is hence admitted under the suction of the piston. This position is maintained by the piston valve until the piston B is at the end of its intake stroke, whereupon the piston valve may move to the position of Fig. 2, wherein the inlet port is closed. During the relative movements of the piston valve and piston before the inlet port is opened, a suction is produced between the valve and piston which, when the inlet port is open, causes the inlet mixture to rush in. This largely increases the amount of intake mixture, since practically speaking a body of mixture is taken in which not only equals the capacity of the cylinder from the high point of the piston to its low point, but in addition the mixture is taken in which practically fills the compression chamber. By this means not only is complete exhaust obtained, so that the incoming mixture is not diluted or fouled, but a larger quantity of fresh mixture is taken into the engine. At the end of the intake stroke as before stated, the piston valve moves to the position of Fig. 2, wherein both ports are closed. This position is maintained until during the compression and firing strokes. At the end of the firing stroke the valve moves down again to exhaust position shown in Fig. 1. The shaft carrying the cam H is preferably a half-speed shaft, motion being preferably taken from the main shaft of the engine, in any suitable way. The cam employed in the construction of Figs. 1 and 2 may be that shown in Fig. 7. A practical development of this cam is shown in Fig. 5, which is a diagram showing the movements of the valve and the movements of the piston. This diagram needs no further explanation.

It will be seen that in Figs. 1 and 2 the shock of compression and firing is taken by the cylinder head against which the piston valve rests during compression and firing. Preferably a wear ring I is interposed at this point against which the piston valve makes contact.

Figure 3:
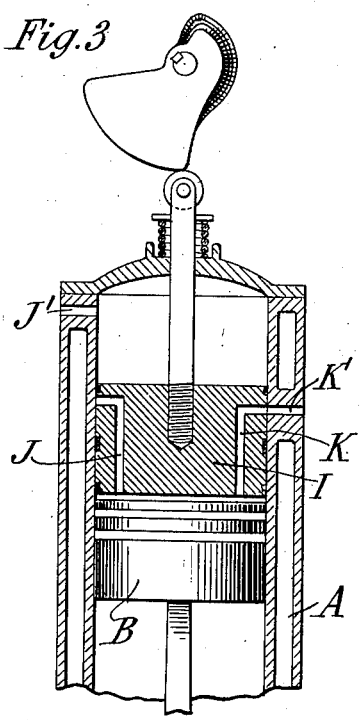
Fig. 3 is a central vertical section of another form.
Figure 4:
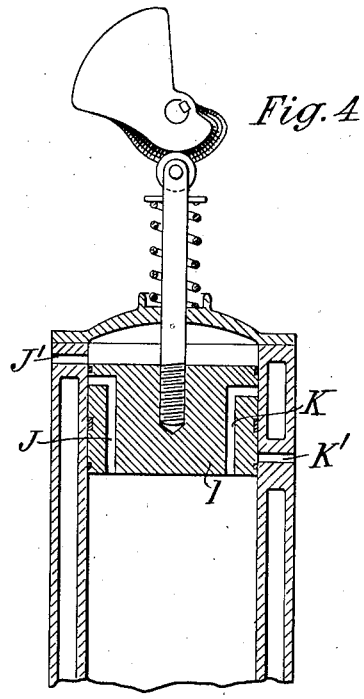
Fig. 4 is a similar view showing the parts in a different position.

In Figs. 3 and 4 the construction of Figs. 1 and 2 is slightly changed. Here the piston valve L is provided with an inlet port J and an exhaust port K. The engine cylinder is provided with an inlet port J' and an exhaust port K'. Instead of the piston valve moving to the top part of its stroke to close the inlet port as in Figs. 1 and 2, the inlet port is opened at the top of its stroke and closed by a downward movement of the piston valve, as shown in Fig. 4. Fig. 4 may be taken as representing the position of the piston valve at the point of maximum compression space which corresponds to the ordinary running of the engine at high efficiency.

Figure 6:
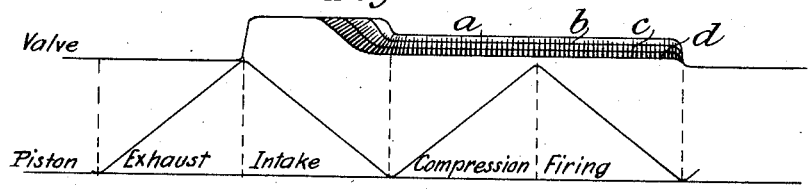
Fig. 6 is a diagram of the movements of the valve and piston of Figs. 3 and 4.

If now it is desired to proportion the efficiency of the engine to the load, it is necessary first that the amount of mixture taken into the cylinder is reduced, and second, that the compression space is reduced. The amount of mixture might be reduced by auxiliary or outside mechanism, but it is preferred that the piston valve not only controls the compression space, but also the intake of mixture. Hence the cam L is movable with relation to its shaft in a longitudinal direction, and its faces are so proportioned that it controls the movement of the piston valve to cut off the intake of mixture, and to depress the valve to the required extent to provide the proper compression space for the charge which has been taken in. By reference to Fig. 6 it will be seen that at the end of the exhaust stroke the valve rises to the intake position. It is held at this position during the descent of the piston until the proper quantity of mixture has been taken in. It is then depressed to close the inlet port and bring the piston valve to the point where it provides the proper compression space. Thus the line $a$ in Fig. 6 shows that the valve has been held open until practically the end of the intake stroke. It is then depressed to close the intake port, and to such a degree that the maximum compression space is attained (such as Fig. 4 for instance). The line $b$ in Fig. 6 indicates that the valve is closed before the piston reaches the end of its intake stroke and the piston valve is depressed further so that the compression space is less. The lines $c$ and $d$ show progressively less intake and smaller compression space. Fig. 8 illustrates a cam adapted to produce these results. In this figure the letters $a\ b\ c\ d$ correspond to the same letters in Fig. 6. The graduated faces of the cam may be on a single incline or a succession of inclines.

Figure 9:
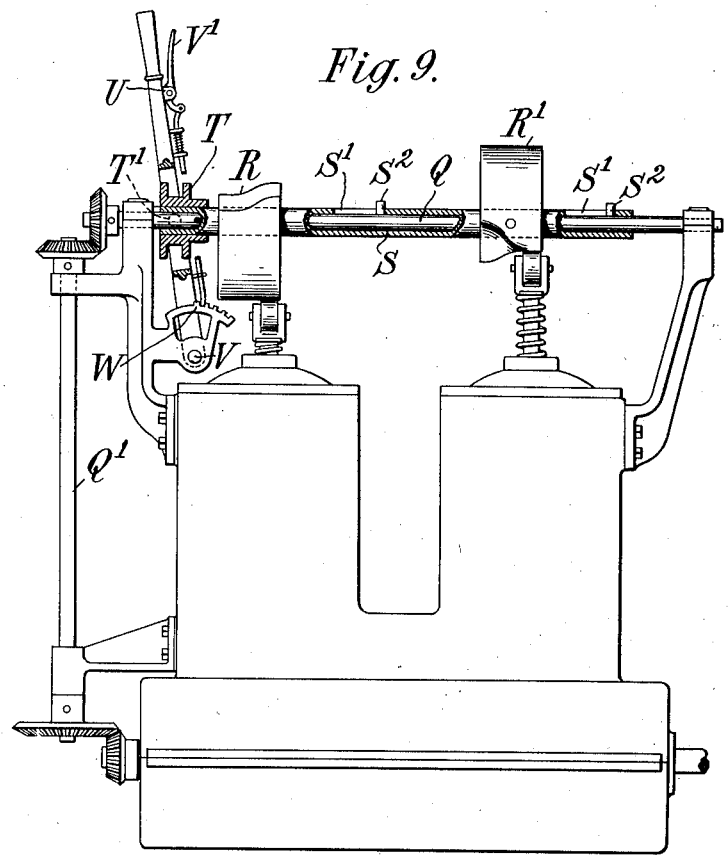
Fig. 9 is a side elevation of a two-cylinder engine, embodying one form of the invention.

In Fig. 9 is shown one embodiment of the invention as applied to a two-cylinder engine. In this figure the cam shaft Q is driven by a shaft Q' through bevelled gears as shown, and the cams R R' are mounted upon a sliding sleeve S which has slots S' within which work pins $S^2$ fixed to the shaft Q. At one end of the sliding sleeve S is fixed a grooved member T engaged by a pin T' carried by the hand lever U. The lever U is pivoted at V and has a hand catch V' engaging a fixed sector W. By this construction the cams R R' may be adjusted at once by hand to the proper position depending upon the power which the engine is required to develop. The provision of a hand controlled or quickly acting device, such as the lever U, is of great importance in adjusting the engine to the amount of power required for a given duty. This adjustment may be made at once under the volition of the operator, and when the engine is set to a certain duty it will not fluctuate until intentionally adjusted. Various features of the invention may, however, be availed of in case it is desired to operate the sleeve by a governor.

In the foregoing drawings the showing is largely diagrammatic, and the forms shown are illustrative rather than practical. Many different arrangements of ports can be adopted to secure the results attained. The piston valve may be operated by a cam or other suitable mechanism directly or indirectly, which cams or other mechanism in the construction of Figs. 3 and 4 should be of sufficient strength to stand the shock of compression and firing. As before stated, the cams may be constructed to raise as well as lower the piston valve; or the cams may raise the valve and the spring lower it; or two cams may be used, one to raise and the other to lower the piston.

To provide for ignition, the piston valve may have a recess M which will fit over the spark plug N which is fixed to the side of the cylinder. Any other arrangement of ignition may be provided. The cylinder heads may have free passages to atmosphere if desired.

It is not necessary that the part of the cylinder in which the piston valve works should be the full diameter of the cylinder within which the piston works. Instead of having the piston valve move up or down, it may be placed at right angles to the cylinder and move horizontally. In this case the valve may be so arranged that it will practically fill the compression space during the exhaust stroke, and the piston shaped accordingly. A check valve may be placed either in the exhaust or in the intake to prevent back pressure. The ports may be made very narrow in a vertical direction and wide in a horizontal direction so as to secure the requisite area. As far as the exhaust port is concerned, as the spent mixture is driven positively through it, there does not exist the same necessity for a large port as in the present constructions. By the construction of Figs. 3 and 4 the speed as well as the efficiency of the engine may be controlled, thus avoiding the use of variable gearing.

I claim as my invention:—

1. In a gas engine, the combination of a cylinder and piston, and a piston valve for reducing or avoiding the normal compression space during the exhaust stroke of the engine, said valve co-operating solely with ports in the cylinder walls.

2. In a gas engine, the combination of a cylinder and piston, and a piston valve governing the exhaust, said valve reducing or avoiding the normal compression space during the exhaust stroke of the engine and said valve co-operating solely with ports in the cylinder walls.

3. In a gas engine, the combination of a cylinder and piston, and a piston valve governing the intake, said valve reducing or avoiding the compression space during the exhaust stroke of the engine, said valve co-operating solely with ports in the cylinder walls.

4. In a gas engine, a cylinder and a piston, said engine having a space into which the charge is compressed, hand-operated means for varying such space, and for varying the quantity of mixture taken into said cylinder, said means acting to make said variations proportionally by varying the period during which the inlet port is opened.

5. In a gas engine, a cylinder, and a piston, said engine having a space into which the charge is compressed, quickly operable means for varying such space, and for varying the quantity of mixture taken into said cylinder, said means acting to make said variations proportionally by varying the period during which the inlet port is opened.

6. In a gas engine, a cylinder, and a piston, said engine having a space into which the charge is compressed, and a single means for varying such space and varying the quantity of mixture taken into said cylinder, by varying the period during which the inlet port is opened.

7. In a gas engine, the combination of a cylinder and a piston, said engine having a space into which the charge is compressed, and a single piston valve adapted to cooperate solely with ports in the cylinder walls and said piston valve being adapted to adjust the normal capacity of said space.

8. In a gas engine, means for firing a charge of explosive mixture, said engine having a space in which said mixture is fired, and positive means for varying the capacity of such space, said means acting to vary the period during which the inlet port is opened to make proportional the quantity of mixture introduced, whereby different charges may be fired at their most effective pressures.

9. In a gas engine, the combination of a cylinder and a piston, said engine having a space in which the charge is compressed, means for adjusting the quantity of mixture introduced into the cylinder by varying the period during which the inlet port is opened, means for adjusting the normal capacity of said compression space, said two means acting proportionally, and a manually operable means for controlling the operation thereof.

10. In a gas engine, the combination of a cylinder and a piston, of means acting in one position to reduce or avoid the compression space whereby to secure better scavenging and in another position to vary the compression space at the end of the compression stroke and a single means for operating said means.

11. In a gas engine, the combination of a cylinder and a power piston, of a second piston movable to a position close to the power piston on its exhaust stroke and away from the power piston on the compression stroke, and a single means for effecting both said movements, said single means varying the last named position of said second piston whereby the size of the compression chamber may be altered to suit various charges of mixture or to produce various degrees of compression.

12. In a gas engine, the combination of a cylinder and a piston, said engine having a space into which the charge is compressed, and a piston valve, said piston valve alone being adapted to control the intake and exhaust solely by its own movement, and being adapted to vary such space, such variation being independent of that produced by the varying displacement of the piston rod.

13. In a gas engine, the combination of a cylinder and a piston, and a piston valve, said piston valve being adapted to control the intake and exhaust solely by its own movement, and being adapted to move toward the piston during the exhaust stroke, and to expel an amount of exhaust gas substantially equal to its displacement during such movement.

14. In a gas engine, a cylinder and a piston, said engine having a space into which the charge is compressed, and quickly operable hand-operated means for varying such space, said means comprising a cam of varying cross-sections transverse to its axis of rotation and a lever for sliding the cam along such axis.

15. In a gas engine, a cylinder, a piston, and a variable cut-off valve for expelling substantially all of the exhaust gases therefrom, and means for moving said valve so that the piston is in close proximity thereto during the exhaust stroke.

16. In a gas engine, a cylinder, a piston, and a variable cut-off piston valve for expelling substantially all of the exhaust gases therefrom, and means for moving said valve so that the piston is in close proximity thereto during the exhaust stroke.

17. In a gas engine, the combination of a cylinder, a piston, and a piston valve, said piston valve adapted to be adjusted with respect to said piston while the engine is running, whereby the compression space of said engine may be varied.

18. In a gas engine, the combination of a cylinder, a piston, and a piston valve, said piston valve adapted to be adjusted with respect to said piston while the engine is running, whereby to vary the compression space, and means for varying the quantity of mixture taken into said cylinder.

19. In a gas engine, the combination of a cylinder, a piston, and a piston valve, said piston valve adapted to be adjusted with respect to said piston, whereby to vary the compression space, means for varying the quantity of mixture taken into said cylinder, and manually-controlled means for automatically producing proportional variations between the compression space and the quantity of mixture taken into said cylinder.

In witness whereof, I have hereunto signed my name.

EUGENE V. MYERS.